United States Patent
Xi

(10) Patent No.: US 12,227,999 B2
(45) Date of Patent: Feb. 18, 2025

(54) METHOD FOR MANUFACTURING DISSOLVABLE SLIP AND DISSOLVABLE SLIP MANUFACTURED BY SAME

(71) Applicant: BEIJING ZHONGKE JIN TENG TECHNOLOGY CO. LTD., Beijing (CN)

(72) Inventor: Junjie Xi, Beijing (CN)

(73) Assignee: BEIJING ZHONGKE JIN TENG TECHNOLOGY CO., LTD., Beijing (CN)

( * ) Notice: Subject to any disclaimer, the term of this patent is extended or adjusted under 35 U.S.C. 154(b) by 1228 days.

(21) Appl. No.: 16/968,077

(22) PCT Filed: Dec. 21, 2018

(86) PCT No.: PCT/CN2018/122515
§ 371 (c)(1),
(2) Date: Aug. 6, 2020

(87) PCT Pub. No.: WO2019/153905
PCT Pub. Date: Aug. 15, 2019

(65) Prior Publication Data
US 2021/0025251 A1   Jan. 28, 2021

(30) Foreign Application Priority Data

Feb. 9, 2018 (CN) .......................... 201810135961.1

(51) Int. Cl.
| | | |
|---|---|---|
| *E21B 19/10* | (2006.01) | |
| *C08K 3/04* | (2006.01) | |
| *C09D 121/00* | (2006.01) | |
| *C09J 5/02* | (2006.01) | |
| *C09J 121/00* | (2006.01) | |
| *C09J 133/04* | (2006.01) | |
| *C09J 163/00* | (2006.01) | |
| *E21B 33/129* | (2006.01) | |

(52) U.S. Cl.
CPC ............ *E21B 19/10* (2013.01); *C09D 121/00* (2013.01); *C09J 5/02* (2013.01); *C09J 121/00* (2013.01); *C09J 133/04* (2013.01); *C09J 163/00* (2013.01); *E21B 33/129* (2013.01); *C08K 3/04* (2013.01); *C09J 2301/20* (2020.08); *C09J 2301/30* (2020.08); *C09J 2301/40* (2020.08); *E21B 2200/08* (2020.05)

(58) Field of Classification Search
None
See application file for complete search history.

(56) References Cited

U.S. PATENT DOCUMENTS

| | | | |
|---|---|---|---|
| 6,378,399 B1* | 4/2002 | Bangert | |
| 8,695,714 B2* | 4/2014 | Xu | |
| 9,518,442 B2* | 12/2016 | Xu | |
| 10,316,616 B2* | 6/2019 | Stafford | |
| 2011/0048743 A1 | 3/2011 | Stafford et al. | |
| 2012/0292053 A1 | 11/2012 | Xu et al. | |
| 2014/0224506 A1 | 8/2014 | Xu et al. | |

FOREIGN PATENT DOCUMENTS

| | | |
|---|---|---|
| CN | 102352168 A | 2/2012 |
| CN | 103201453 A | 7/2013 |
| CN | 103547766 A | 1/2014 |
| CN | 104403644 A | 3/2015 |
| CN | 205858269 U | 1/2017 |
| CN | 106522869 A | 3/2017 |
| CN | 106639963 A | 5/2017 |
| CN | 106801590 A | 6/2017 |
| CN | 107419204 A | 12/2017 |
| CN | 107630676 A | 1/2018 |
| CN | 108571295 A | 9/2018 |

OTHER PUBLICATIONS

The State Intellectual Property Office of People's Republic of China, First Office Action, Application No. 201810135961.1, Issued: May 22, 2019, Applicant: Beijing Zhongke Jin Teng Technology Co. Ltd.
Patent Cooperation Treaty, Written Opinion and International Search Report, PCT/CN2018/122515, Date of Mailing: Mar. 21, 2019, Applicant: Beijing Zhongke Jin Teng Technology Co. Ltd.

* cited by examiner

*Primary Examiner* — Michael N Orlando
*Assistant Examiner* — Abhishek A Patwardhan
(74) *Attorney, Agent, or Firm* — Flener IP & Business Law; Zareefa B. Flener

(57) ABSTRACT

Disclosed are a method for manufacturing a dissolvable slip and a dissolvable slip manufactured by same. The manufacturing method sequentially comprises the following steps: (1) mixing an adhesive with solid particles and dissolvable particles; (2) coating the mixture prepared in step (1) on the surface of a slip body; and (3) curing the mixture coated in step (2). The dissolvable slip manufactured according to the manufacturing method not only has a stronger anchoring force with a wellbore inner wall, but also can adjust the dissolution rate of the slip after the completion of fracturing to enable the slip to degrade within a preset time. Further, the dissolvable slip has a better abrasion resistance, is suitable for various temperature conditions, and can still work normally in a concentrated acid or a concentrated alkali environment.

6 Claims, No Drawings

METHOD FOR MANUFACTURING DISSOLVABLE SLIP AND DISSOLVABLE SLIP MANUFACTURED BY SAME

The present application claims the priority of Chinese Patent Application No. 201810135961.1 entitled "Method for Manufacturing Dissolvable Slip and Dissolvable Slip Manufactured by Same" filed on Feb. 9, 2018.

FIELD OF THE INVENTION

The present invention belongs to the field of petroleum drilling, and relates to a method for manufacturing a dissolvable slip and a dissolvable slip manufactured by same.

BACKGROUND OF THE INVENTION

As global oil and gas fields are exploited and energy is gradually depleted, unconventional oil and gas will become an important substitute of oil and gas energy in the future. Unconventional petroleum such as super heavy crude oil, oil sands oil, tight oil and shale oil as well as unconventional natural gas resources such as tight sandstone gas, shale gas and coalbed methane have higher reserves than conventional oil and gas reserves, and have infinite potential for exploration and exploitation. However, as unconventional oil reservoirs have characteristics such as high specific gravity, many impurities and high viscosity, and unconventional natural gas reservoirs have characteristics such as low porosity and ultra-low permeability, the cost of exploiting these oil and gas reservoirs is high. However, as conventional oil and gas resources reduce and production cost rises, more and more attention is paid to the exploitation and utilization of unconventional oil and gas reserves. For the exploitation of such unconventional oil and gas reserves, the reservoirs may be modified first to effectively increase the production of a single well. At present, a technique such as fracturing is commonly used.

In the field of petroleum, fracturing refers to a method of using hydraulic power or high-energy gas to form cracks in oil and gas formations during oil or gas exploitation. Fracturing means artificially creating cracks in the formation to improve the underground flow environment of oil and gas and increase the production of oil and gas wells, and plays a very important role in improving bottom hole flow conditions and improving oil layer flow conditions.

In the fracturing process, fracturing tools (such as bridge plugs, sliding sleeves, dividers, etc.) are first dropped down to the well, and fixed at a certain section of the oil and gas well by slips, and then pressure is applied into the well, whereupon the slips needs to be attached with a high strength to the inner wall of the wellbore under a pressure of up to 70 MPa to smoothly complete the fracturing operation. After the fracturing is completed, the fracturing tools need to be detached to achieve full bore of the wellbore and ensure the oil and gas production. A conventional detachment manner may include drilling away directly. However, since the fracturing tools stay in the well with a longer length and are in a large number, drilling away the fracturing tools will consumes a longer period of time and delays the later production of oil and gas wells.

In this regard, researchers design dissolvable slips which can completely dissolve or degrade downhole after fracturing to form small particles and fragments which are made flow back to the ground surface together with fracturing tools through a reverse discharge process or directly pushed to the bottom of the well. As such, the production efficiency can be greatly improved, the cost of later oil well maintenance can be reduced, and oil and gas production can be increased.

SUMMARY OF THE INVENTION

Technical Problem

After studying the currently-existing dissolvable slips, the Inventor found that the dissolvable slips have a relatively low self-strength and are not resistant to friction and erosion, and the surfaces of bodies of the dissolvable slips are liable to oxidize and difficult to weld. To solve the above-mentioned drawbacks, the Inventor conducted in-depth research and obtained the present invention.

The present invention provides a method for manufacturing dissolvable slips. According to the method, the slips can completely dissolve or degrade downhole on their own after the fracturing, the dissolution rate of the slips can be adjusted so that they may degrade within a preset period of time, and the manufacturing slips have a better resistance against friction, are adapted for various temperature conditions and can still work normally in a concentrated acid or alkali environment.

In addition, the present invention further provides a dissolvable slip manufactured by the above method.

Technical Solution

According to an embodiment of the present invention, there is provided a method for manufacturing a dissolvable slip, comprising the following steps:
(1) mixing an adhesive with solid particles and dissolvable particles;
(2) coating a mixture prepared in step (1) on a surface of a slip body; and
(3) curing the mixture coated in step (2).

In the method for manufacturing a dissolvable slip according to the present invention,
the adhesive may include one or more organic or inorganic adhesives,
the solid particles may include particles prepared from at least one selected from a group consisting of ceramic, diamond, silicon carbide, cubic boron nitride, zirconia, alumina, etc.,
the dissolvable particles may be particles prepared from a self-dissolvable material formed by the composite of metal and ceramic powder, and
the slip body contains materials that are dissolvable in pure water, potassium salt solution, sodium salt solution, calcium salt solution, magnesium salt solution, inorganic acid, etc. For example, the slip body contains a material that is dissolvable in at least one selected from a group consisting of sodium chloride, potassium chloride, calcium chloride, magnesium chloride, sodium sulfate, magnesium sulfate, hydrochloric acid, etc.

In addition, the mixing ratio of the adhesive, solid particles and dissolvable particles by weight is not limited so long as the mixture can be adhered to the slip body.

Preferably, in the above step (1), the organic or inorganic adhesive may include acrylic adhesive, phenolic resin adhesive, epoxy resin adhesive, rubber vulcanized adhesive, etc.

The solid particles have a high hardness, and they may function to improve an anchoring effect of the dissolvable slip and resist against friction and erosion. Furthermore, the solid particles may have a granularity of 2 μm to 5 mm.

The dissolvable particles can promote formulated dissolution of the adhesive and binding process, so they may promote the degradation and dissolution of the coating after the fracturing. For example, preferably, the dissolvable particles are a self-dissolvable material by combining a metal raw material (e.g., two or more selected from a group consisting of iron, magnesium, aluminum, copper, silicon, calcium, nickel, zinc and titanium) with ceramic powder (e.g., one or more selected from a group consisting of diatomaceous earth, Zeolite, white carbon black, mica and vermiculite) by a powder metallurgy process or a smelting casting process. In addition, the dissolvable particles may be, for example, particles prepared from the self-dissolvable material disclosed in the invention patent application CN201410609926.0, which is incorporated herein by reference in its entirety.

The shape and configuration of the slip body can be those commonly used in the field. In addition, the material of the slip body is not particularly limited, as long as it contains a material dissolvable in the above-mentioned pure water or solution (for example, a fracturing fluid or reverse discharge fluid containing the solution component in the petroleum field). For example, the slip body may contain metal elements such as magnesium, aluminum and zinc. For example, the material of the slip body may be magnesium alloy, aluminum alloy, magnesium aluminum alloy, etc., and may also contain dissolvable organics, but not limited to this.

Preferably, in the above step (2), a thickness of the coating of the mixture prepared in step (1) may be in a range from 0.01 mm to 5 mm.

Preferably, in the above step (3), the curing method may be a method of curing the adhesive often used in the art, such as cold curing, normal temperature curing, thermal curing, ultraviolet curing, rubber vulcanization, etc., but not limited thereto.

In addition, the method for manufacturing a dissolvable slip according to the present invention may further comprise a step of increasing a specific surface area of the slip body before step (2). The step of increasing the specific surface area of the slip body may be performed by a process such as cleaning, sandblasting, patterning, adding grooves, etc., but not limited thereto. Increasing the specific surface area of the slip body is beneficial to expand the bonding area between the coated mixture and the slip, thereby increasing the bonding strength with the solid particles and dissolvable particles and meanwhile reducing the wear on the surface of the slip body, and may reduce the falling off of the solid particles and dissolvable particles caused by collision with the inner wall of the wellbore while the dissolvable slip according to the present invention gets downhole.

In addition, the method for manufacturing the dissolvable slip according to the present invention may further include a step of coating a protective rubber layer on the surface of the dissolvable slip after step (3). For example, coating a protective rubber layer (such as a rubber coating) on the surface of dissolvable slip may ensure that the dissolvable slip prepared according to the present invention will not dissolve down the well under a high temperature and a high salinity for 100 hours. Furthermore, the resistance of the rubber against acid and alkali may be used to slow down the degradation and dissolution in an environment that the adhesive is in contact with high-salinity water, strong acid and strong alkali. Here, the rubber may be a natural rubber or synthetic rubber commonly used in the field, such as isoprene rubber, styrene butadiene rubber, butadiene rubber, neoprene rubber, nitrile rubber, silicone rubber, etc., but not limited thereto.

In addition, the method for manufacturing the dissolvable slip according to the present invention may further include a step of coating the surface of the slip body with a base coating before step (2). Coating the surface of the slip body with the base coating may take advantage of its high adhesion to the slip body to increase the bonding strength between the coating of the adhesive, solid particles and dissolvable particles and the slip, and may especially solve the problem about inconsistent dissolution rate with the slip body containing magnesium alloy when phenolic resin is used as the adhesive.

According to another embodiment of the present invention, there is provided a method for manufacturing a dissolvable slip, comprising sequentially the following steps:
(1) mixing diamond, acrylate adhesive and dissolvable particles in a weight ratio of 85:10:5;
(2) coating the mixture prepared in step (1) on the surface of the magnesium alloy slip body; and
(3) curing at a high temperature of 180° C.

In this way, a dissolvable slip resistant against a high temperature of 120° C. is formed.

The aforementioned acrylate adhesive may be an adhesive containing acrylate.

The above-mentioned magnesium alloy slip body refers to a slip whose body is made of magnesium alloy commonly used in the art.

According to another embodiment of the present invention, there is provided a method for manufacturing a dissolvable slip, comprising sequentially the following steps:
(1) mixing diamond, epoxy resin and dissolvable particles in a weight ratio of 90:5:5;
(2) coating the mixture prepared in step (1) on the surface of the magnesium alloy slip body; and
(3) curing at a cold temperature.

In this way, a low-temperature slip resistant against a cold temperature below 80° C. is formed.

The aforementioned cold temperature may be a temperature in a range between 80° C. and 0° C.

The aforementioned epoxy resin adhesive may be an adhesive containing epoxy resin.

The above-mentioned magnesium alloy slip body refers to a slip whose body is made of magnesium alloy commonly used in the art.

According to another embodiment of the present invention, there is provided a dissolvable slip manufactured by the above-mentioned method of the present invention.

The dissolvable slip manufactured according to the present invention may be used in fracturing tools, such as bridge plugs, sliding sleeves, dividers, etc. After the fracturing is completed, the dissolvable slips dissolve in the downhole fracturing liquid or reverse discharge liquid or decompose into small pieces/particles.

Therefore, according to a further embodiment of the present invention, there is provided an article comprising the dissolvable slip prepared according to the present invention.

Advantageous Effects

The dissolvable slips manufactured according to the present invention not only have a strong anchoring force with the inner wall of the wellbore (≥70 MPa). Furthermore, after the fracturing is finished, the dissolution rate of the slips can be adjusted so that the slips degrade in a preset period time. Therefore, the slips are widely used in mineral mining, and greatly improve the production efficiency.

The present invention addresses drawback such as low self-strength and inability to resist against friction and erosion of slips through the mixture coating in which the adhesive, solid particles and dissolvable particles are mixed, and meanwhile solves problems of the slip body such as easy oxidization and difficulty in welding. Hence, the manufacturing method according to the present invention has advantages such as low cost, easy operation, and high process performance.

DETAILED DESCRIPTION OF PREFERRED EMBODIMENTS

Hereinafter, the present invention will be described in more detail.

Terms or words used in the present specification and the claims are not to be interpreted limitedly to common or dictionary meanings, and shall be interpreted as meanings and concepts corresponding to technological ideas of the present invention based on a principle in which inventors may suitably define the concepts of terms in order to describe their own invention in the best possible way.

The manufacturing method of the dissolvable slip of the present invention will be described below through specific examples.

Example 1

The diamond, acrylate adhesive and dissolvable particles are mixed in a weight ratio of 85:10:5, and the mixture is coated on the surface of the slip body, and cures at a high temperature of 180° C. to prepare a dissolvable slip resistant against a high temperatures of 120° C.

The dissolvable particles are particles prepared from the self-dissolvable material disclosed in Embodiments 1-9 of the invention patent application CN201410609926.0.

Example 2

The diamond, epoxy resin adhesive and dissolvable particles are mixed in a weight ratio of 90:5:5, and the mixture is coated on the surface of the slip body and cures at a temperature 80° C. to form a dissolvable slip resistant against the temperature 80° C.

The dissolvable particles are particles prepared from the self-dissolvable material disclosed in Embodiments 1-9 of the invention patent application CN201410609926.0.

Example 3

A dissolvable slip is prepared in the same manner as in Example 1 or 2 except that grooves are added on the surface of the slip body.

Example 4

A dissolvable slip is prepared in the same manner as in Example 1 or 2, and then a rubber coating is coated on the surface of the slip.

Example 5

The diamond, rubber vulcanized adhesive and dissolvable particles are mixed in a weight ratio of 90:5:5, and the mixture is coated on the surface of the slip body, and molded and vulcanized to form the dissolvable slip.

The dissolvable particles are particles prepared from the self-dissolvable material disclosed in Embodiments 1-9 of the invention patent application CN201410609926.0.

What is claimed is:

1. A method for manufacturing a dissolvable slip, comprising sequentially the following steps:
    (1) mixing an adhesive with solid particles and dissolvable particles;
    (2) coating a mixture prepared in step (1) on a surface of a slip body; and
    (3) curing the mixture coated in step (2).

2. The method according to claim 1, wherein
    the adhesive includes one or more selected from a group consisting of acrylic adhesive, phenolic resin adhesive, epoxy resin adhesive and rubber vulcanized adhesive,
    the solid particles include particles prepared from at least one selected from a group consisting of ceramic, diamond, silicon carbide, cubic boron nitride, zirconia and alumina,
    the dissolvable particles are particles prepared from a self-dissolvable material formed by combining a metal with ceramic powder, and/or
    the slip body contains materials that are dissolvable in pure water, potassium salt solution, sodium salt solution, calcium salt solution, magnesium salt solution or inorganic acid.

3. The method according to claim 1, wherein the slip body contains a material that is dissolvable in at least one selected from a group consisting of sodium chloride, potassium chloride, calcium chloride, magnesium chloride, sodium sulfate, magnesium sulfate or hydrochloric acid, wherein the material of the slip body is preferably magnesium alloy, aluminum alloy or magnesium aluminum alloy; and/or
    the solid particles have a granularity of 2 μm to 5 mm.

4. The method according to claim 1, wherein in the above step (2), a thickness of the coating of the mixture prepared in step (1) is in a range from 0.01 mm to 5 mm.

5. The method according to claim 1, wherein the manufacturing method comprises a step of increasing a specific surface area of the slip body before step (2) or a step of coating the surface of the slip body with a base coating before step (2), wherein the step of increasing the specific surface area of the slip body is preferably performed by a process including cleaning, sandblasting, patterning or adding grooves.

6. The method according to claim 1, wherein the manufacturing method comprises a step of coating a protective rubber layer on the surface of the dissolvable slip after step (3).

* * * * *